US012761798B2

(12) United States Patent
Wang et al.

(10) Patent No.: US 12,761,798 B2
(45) Date of Patent: Oct. 13, 2026

(54) REDUCING READ LATENCY BASED ON LOGICAL TRANSLATION UNIT MISMATCH STATUSES

(71) Applicant: Micron Technology, Inc., Boise, ID (US)

(72) Inventors: Su Juan Wang, Shanghai (CN); Kun Jiang, Shanghai (CN); Yu Long Guan, Shanghai (CN); Guang Shen, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 31 days.

(21) Appl. No.: 19/058,687

(22) Filed: Feb. 20, 2025

(65) Prior Publication Data

US 2026/0244344 A1 Aug. 20, 2026

(51) Int. Cl.
*G06F 3/06* (2006.01)

(52) U.S. Cl.
CPC .......... *G06F 3/0611* (2013.01); *G06F 3/0659* (2013.01); *G06F 3/0683* (2013.01)

(58) Field of Classification Search
None
See application file for complete search history.

(56) References Cited

U.S. PATENT DOCUMENTS

2009/0070539 A1* 3/2009 Haustein ............. G06F 11/1435
711/E12.103
2014/0089728 A1* 3/2014 Veal .................... G06F 11/1474
714/6.21
2017/0286244 A1* 10/2017 Fukutomi ........... G06F 11/0751

FOREIGN PATENT DOCUMENTS

KR 20080058161 A * 6/2008 ......... G11B 20/1803

* cited by examiner

*Primary Examiner* — Brian R Peugh
(74) *Attorney, Agent, or Firm* — Lowenstein Sandler LLP

(57) ABSTRACT

A command to perform a memory access operation on a logical block address (LBA) associated with a blockstripe is received from a high-speed processing device. Data associated with a plurality of LBAs, including the LBA, is read from a memory device based on receiving the command. The data associated with the plurality of LBAs is stored in a data segment. A status of each LBA of the plurality of LBAs associated with the data segment is determined. Based on determining that one or more LBAs of the plurality of LBAs associated with the data segment correspond to a logical translation unit mismatch status, data associated with the one or more LBAs is provided to the high-speed processing device. An updated data segment comprising data corresponding to the LBA is received from the high-speed processing device. The memory access operation is performed on the memory device using the updated data segment.

20 Claims, 6 Drawing Sheets

REDUCING READ LATENCY BASED ON LOGICAL TRANSLATION UNIT MISMATCH STATUSES

TECHNICAL FIELD

Embodiments of the disclosure relate generally to memory sub-systems, and more specifically, relate to reducing read latency based on logical translation unit (LTU) mismatch statuses.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
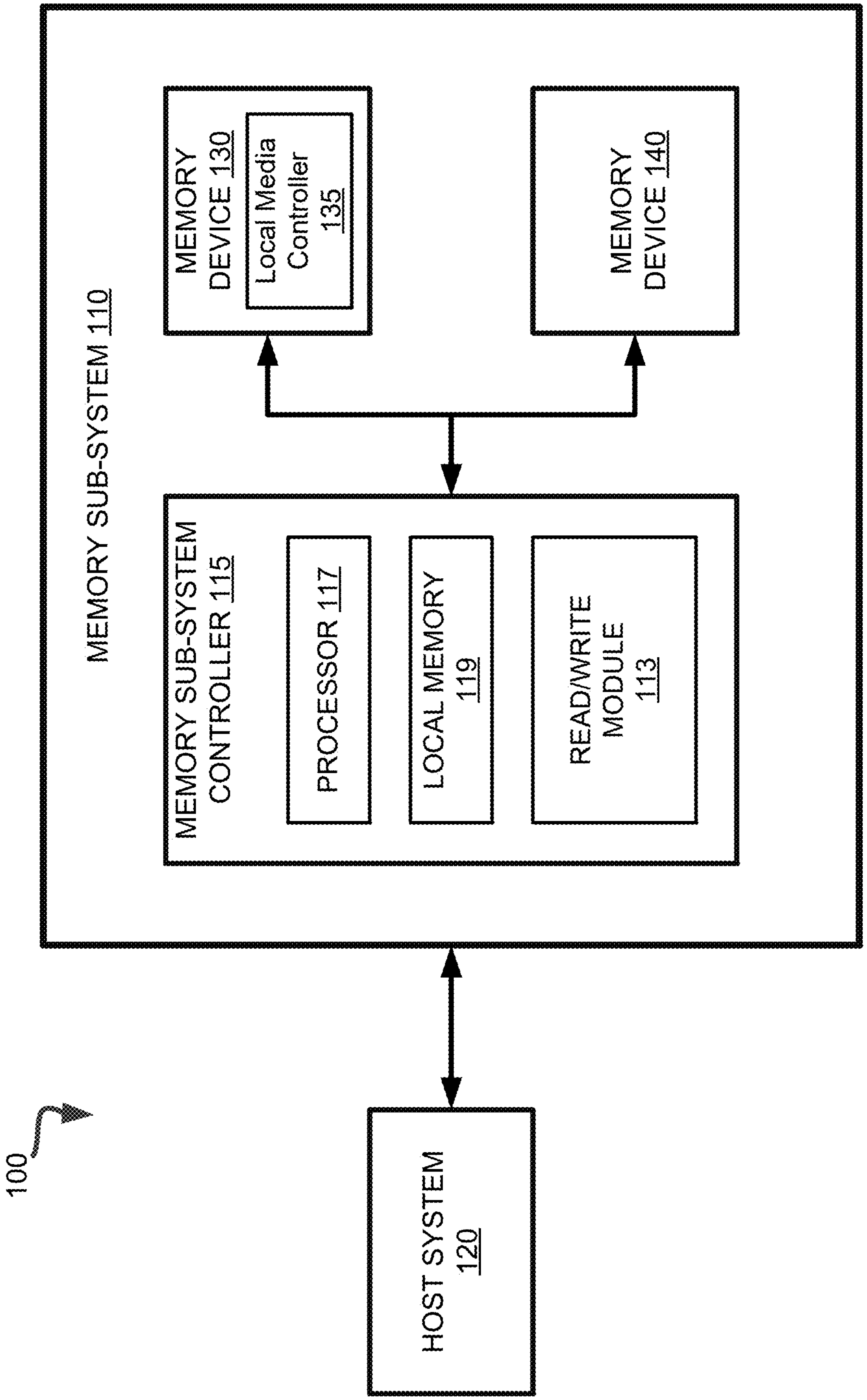
FIG. 1 illustrates an example computing system that includes a memory sub-system, in accordance with some embodiments of the present disclosure.

Aspects of the present disclosure are directed to reducing read latency based on logical translation unit (LTU) mismatch statuses. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory sub-system can include a plurality of high-speed central processing units (HS CPUs) that communicate (e.g., via a system bus) with at least a plurality of channel CPUs (also referred to herein as a plurality of channel cores). A channel CPU can be coupled to a plurality of memory devices (e.g., NAND devices) on a channel that corresponds to the channel CPU. A HS CPU can transmit commands (e.g., read commands, write commands) to a channel CPU for execution on one or more dies associated with a specific memory device (e.g., a NAND memory device) on the channel. In some instances, a plurality of dies associated with the memory device can be associated with a plurality of channels such that each channel includes a subset of the plurality of dies associated with the memory device.

As described above, each die can contain a plurality of planes and each plane can include multiple memory cells (also referred to herein as blocks). A blockstripe can include a subset of blocks associated with each plane of each die on a memory device. Each block on a blockstripe can correspond to a logical block address (LBA) that is mapped to a physical block address. A logical block address can be a virtual address that corresponds to the block and is used by one or more CPUs during the execution of an application, program, etc. A physical block address can indicate a location on a memory device where the data associated with the block and the corresponding LBA is stored. Read and/or write operations can be executed on specific LBAs to read data from and/or write data to corresponding physical block addresses.

To read data from and/or write data to a block, a host CPU that is associated with a host device can transmit a command to a channel CPU that is associated with the block. In some instances, the command can include data to be written to a physical block address that corresponds to an LBA associated with the block. In some instances, the command can include instructions to read data from the physical block address associated with the block. The channel CPU can read a translation unit (TU) from the memory device. The TU can be used for performing the command and can include data that corresponds to a subset of blocks, including the block on which the command will be performed. Based on reading the TU from the memory device, the channel CPU can determine, for each block associated with the TU, whether an LBA associated with a block maps to a physical block address on a memory device. A block for which the corresponding LBA does not map to a physical block address can be associated with a logical TU (LTU) mismatch status. The channel CPU can transmit to a flash translation layer (FTL) CPU data that is associated with the blocks that have a LTU mismatch status. The FTL CPU can add each block that has a LTU mismatch status to an error queue (e.g., a first-in-first-out queue) for further analysis. However, the efficiency with which the FTL CPU analyzes the blocks in the error queue is dependent upon the number of blocks in the error queue. Specifically, the more blocks in the error queue, the longer the FTL CPU can take to verify the LTU mismatch status of the most recent blocks added to the error queue. The FTL CPU can transmit a data segment (e.g., a buffer) to the host CPU to enable the host CPU to proceed with the read and/or write command. However, the execution of the read and/or write command can be subject to increased latency based on the time needed for the FTL CPU to analyze a specific block in the error queue.

Aspects of the present disclosure address the above and other deficiencies by reducing the hardware complexity of a memory device in order to reduce read latency based on logical translation unit (LTU) mismatch statuses. The method described herein can be performed by any channel CPU, of the plurality of channel CPUs, that is associated with a memory device. As described above, a host CPU that is associated with a host device can transmit a command to a channel CPU in order to read data from and/or write data to a block that is associated with the channel CPU. The channel CPU can read the translation unit (TU) from the memory device and determine, for each block associated with the TU, whether an LBA associated with a block maps to a physical block address on the memory device. In some instances, the channel CPU can determine that a block does not map to a physical block address on the memory device, thereby resulting in a LTU mismatch status associated with the block. The channel CPU can transmit to the host CPU a data segment containing data that corresponds to the blocks associated with the TU (e.g., a status associated with each block). In some instances, the host CPU can confirm whether the LBA of each block associated with the data segment corresponds to a physical block address to determine whether the LTU mismatch status is real. Based on determining that the LTU mismatch status is real, the host CPU can flag the block for manual intervention (e.g., by administrators associated with the memory device, the host device, etc.). Based on determining that the LTU mismatch status is not real, the host CPU can proceed with the performance of the read and/or write command. In instances where the command is a write command, the host CPU can update the received data segment with the data to be written to the block. The host CPU can transmit the updated data segment to the channel CPU. The channel CPU can write the data in the updated data segment to the block. In instances where the command is a read command, the host CPU can read data from the block based on the received data segment and provide the read data to the host device.

Advantages of the present disclosure include, but are not limited to, reducing latency associated with performing read and/or write commands on a memory device. Advantages of the present disclosure further include the timely release of the data segment (or the updated data segment) to the channel CPU to perform the read and/or write command on the memory device. Advantages of the present disclosure also include the reduced complexity of memory device hardware for executing read and/or write commands.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a read/write module 113 that can perform the read and/or write commands described herein. In some embodiments, the memory sub-system controller 115 includes at least a portion of the read/write module 113. In some embodiments, the read/write module 113 is part of the host system 120, an application, or an operating system. In other embodiments, local media controller 135 includes at least a portion of the read/write module 113 and is configured to perform the functionality described herein.

In some instances, the read/write module 113 can be executed by a channel CPU of a plurality of channel CPUs associated with the computing system 100. The read/write module 113 can receive from a host device (e.g., a device that includes host system 120) a command to read data from and/or write data to a block associated with a memory device, such as one of memory devices 130, 140. The read/write module 113 can read a translation unit (TU) from the memory device, where the TU can be used to read data from and/or write data to the memory device. The read/write module 113 can determine a status associated with each block that is associated with the TU. The read/write module 113 can generate a data segment that contains, in some instances, the status of each block of the TU or the data that stored in the physical block addresses that correspond to each block of the TU. In instances where the received command is a read command, the read/write module 113 can read the data from the block and provide the read data to the host device. In instances where the received command is a write command, the read/write module 113 can transmit the data segment to a host CPU associated with the host device. The read/write module 113 can receive from the host CPU an updated data segment that contains the data to be written to the block. The read/write module 113 can write the data in the updated data segment to the block. Further details regarding the operations of the read/write module 113 are described below.

Figure 2:
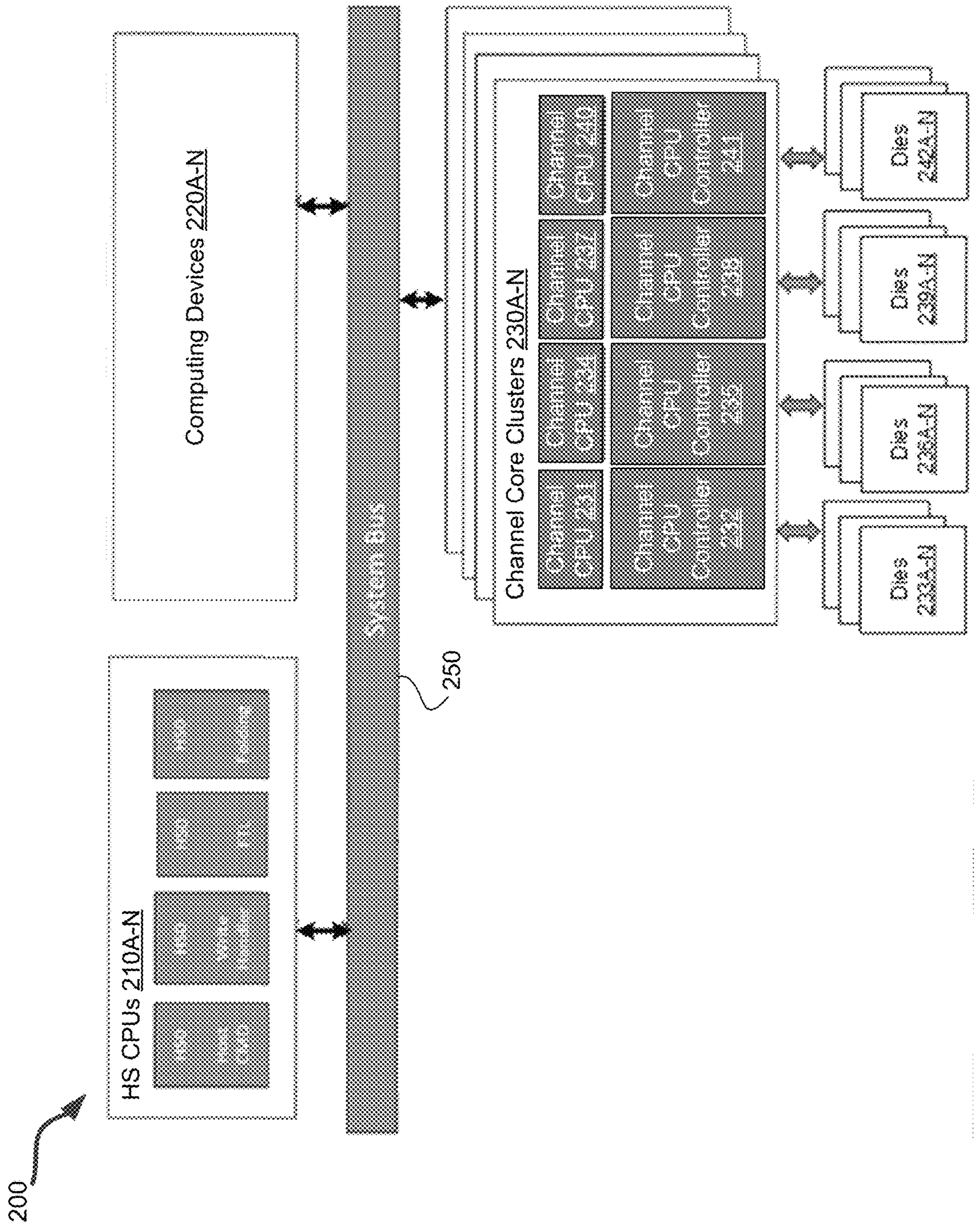
FIG. 2 illustrates an example computing system that includes a memory sub-system, in accordance with some embodiments of the present disclosure.

FIG. 2 illustrates an example computing system that includes a memory sub-system, in accordance with some embodiments of the present disclosure. Example computing system 200 can include high-speed central processing units (CPUs) 210*a-n*, computing devices 220*a-n*, system bus 250, and/or channel core clusters 230*a-n*. In some instances, computing system 200 and the components therein can correspond to components of computing system 100. For example, a computing device that includes host system 120 can correspond to any of HS CPUs 210*a-n*. As such, HS CPUs 210*a-n* can generate commands to write data to and/or read data from specific LBAs. In some instances, channel core clusters 230*a-n* can reside within memory sub-system controller 115. In such instances, any of channel CPUs 231, 234, 237, 240 can correspond to read/write module 113. As such, channel CPUs 231, 234, 237, 240 can process the commands that are generated by HS CPUs 210*a-n*. In some instances, dies 233*a-n*, 236*a-n*, 239*a-n*, 242*a-n* can correspond to memory devices 130, 140. The components of computing system 200 are described in further detail below.

A HS CPU can be a CMD host CPU, a write handler CPU, a flash translation layer (FTL) CPU, and/or a folding CPU. In some instances, any one of HS CPUs 210*a-n* can be configured to perform the operations of the HS CPUs described herein.

Computing system 200 can further include additional computing devices, such as computing devices 220*a-n*. Computing devices 220*a-n* can correspond to any of a double data rate (DDR) controller, a universal asynchronous receiver/transmitter (UART), a power management unit (PMU), a component that implements an improved inter integrated circuit (I3C) standard, a distributed management environment (DME) component, and/or additional and/or alternative memory devices (e.g., a static random-access memory (SRAM) device).

In some instances, computing system 200 can include a peripheral component interconnect express (PCIe) controller. The PCIe controller can facilitate communication between the computing system 200 and one or more peripheral devices coupled to the computing system 200. The computing system 200 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

Computing system 200 can include channel core clusters 230*a-n*. A channel core cluster can include a plurality of channels associated with a memory device (e.g., a NAND memory device). As described above, each channel can include a channel CPU (e.g., channel CPUs 231, 234, 237, 240) and a channel CPU controller (e.g., channel CPU controllers 232, 235, 238, 241). As described above, each channel can include a plurality of dies associated with the memory device (e.g., dies 233*a-n*, 236*a-n*, 239*a-n*, 242*a-n*), and each die can include a plurality of blocks. The plurality of blocks can be associated with a plurality of blockstripes of the memory device where a blockstripe includes at least one block of each die associated with the memory device.

A channel can receive (e.g., via a channel CPU and/or a channel CPU controller associated with the channel), from a HS CPU (e.g., one of HS CPUs 210*a-n*), commands to be executed on a block that is associated with the channel. For example, the channel CPU and/or the channel CPU controller can receive commands to read data from and/or write data to a block. In some instances, the channel CPU controller associated with the channel can coordinate the execution of a plurality of commands.

The HS CPU can transmit a command to a channel CPU. In some instances, the command can include data to be written to a block that is associated with a memory device that is on the channel that corresponds to the channel CPU. In some instances, the command can include instructions to read data from the block. The HS CPU can receive from the channel CPU a data segment (e.g., a buffer) that contains data associated with a subset of blocks on the memory device. The subset of blocks can include the block to/from which data is to be written and/or read. In instances where the command is a write command, the HS CPU can update the received data segment to include the data to be written to the block. By doing so, the HS CPU can generate an updated data segment. The HS CPU can transmit the updated data segment to the channel CPU to enable the channel CPU to write the data to the block, for example.

The channel CPU can receive a command (e.g., a write command, a read command) from the HS CPU. The channel CPU can read a translation unit (TU) from a memory device on which a physical block address associated with the block is located. The TU can include a subset of blocks that are located on the memory device. The subset of blocks can include the block to/from which data is to be written and/or read. In some instances, the size of the TU can be based on the size of the data packet to be written to the block, system requirements for reducing the latency associated with performing the read and/or write command, system requirements for reducing the amount of bandwidth that is needed to perform the read and/or write commands, the capacity of the memory device, the size of the portion of the memory device that is used to store a table containing logical block addresses (LBAs) to physical block addresses mappings (e.g., an L2P table), etc. For example, a write command can include a 4 KB data packet to be written to a block on a 64

TB memory device that requires 16 GB to store an L2P table. In such instances, the latency and bandwidth that is needed to perform the write command can be reduced by using a 16 KB TU.

In some instances, the data in the TU can indicate a status of each block of the subset of blocks. A block status can indicate whether a block has been written to (e.g., data is stored in a physical block address associated with the block) or is unwritten (e.g., data is not stored in the physical block address associated with the block). In some instances, an unwritten block status can indicate that the LBA associated with the block does not map to a physical block address on the memory device. A block that is associated with an LBA that does not map to a physical block address can have a logical TU (LTU) mismatch status.

The channel CPU can provide the determined status of each block of the subset of blocks to the HS CPU via a data segment. In instances where the command contains data to be written to the block, the channel CPU can receive from the HS CPU an updated data segment that contains the data to be written to the block. For each of the other blocks of the subset of blocks, the updated data segment can include the data from the data segment (e.g., the status of a block, data that is written to a block). The channel CPU can execute the write command by writing the data to be written to the block, as indicated in the updated data segment, to the block.

In instances where the received command contains instructions to read data from the block, the channel CPU can use the TU to read the data stored in the physical block address that is associated with the block. In some instances, the channel CPU can determine that the block is associated with a LTU mismatch status. The channel CPU can provide the status of the block to the HS CPU. The HS CPU can determine whether the LBA of the block corresponds to a physical block address on the memory device in order to determine whether the LTU mismatch status is real. The HS CPU can determine that the LTU mismatch status is real when the LBA of the block does not correspond to a physical block address on the memory device. In some instances, based on determining that the LTU mismatch status is real, the HS CPU can provide the host device (e.g., a device that includes host system 120) with data indicating an error in the mapping between the LBA of the block and a corresponding physical block address. In some instances, based on determining that the LTU mismatch status is not real, the HS CPU can read the data stored in the physical block address that is associated with the block and can provide the read data to the host device.

In some instances, the components of computing system 200 (e.g., HS CPUs 210*a-n*, computing devices 220*a-n*, channel core clusters 230*a-n*, dies 233*a-n*, dies 236*a-n*, dies 239*a-n*, dies 242*a-n*) can communicate via system bus 250.

Figure 3:
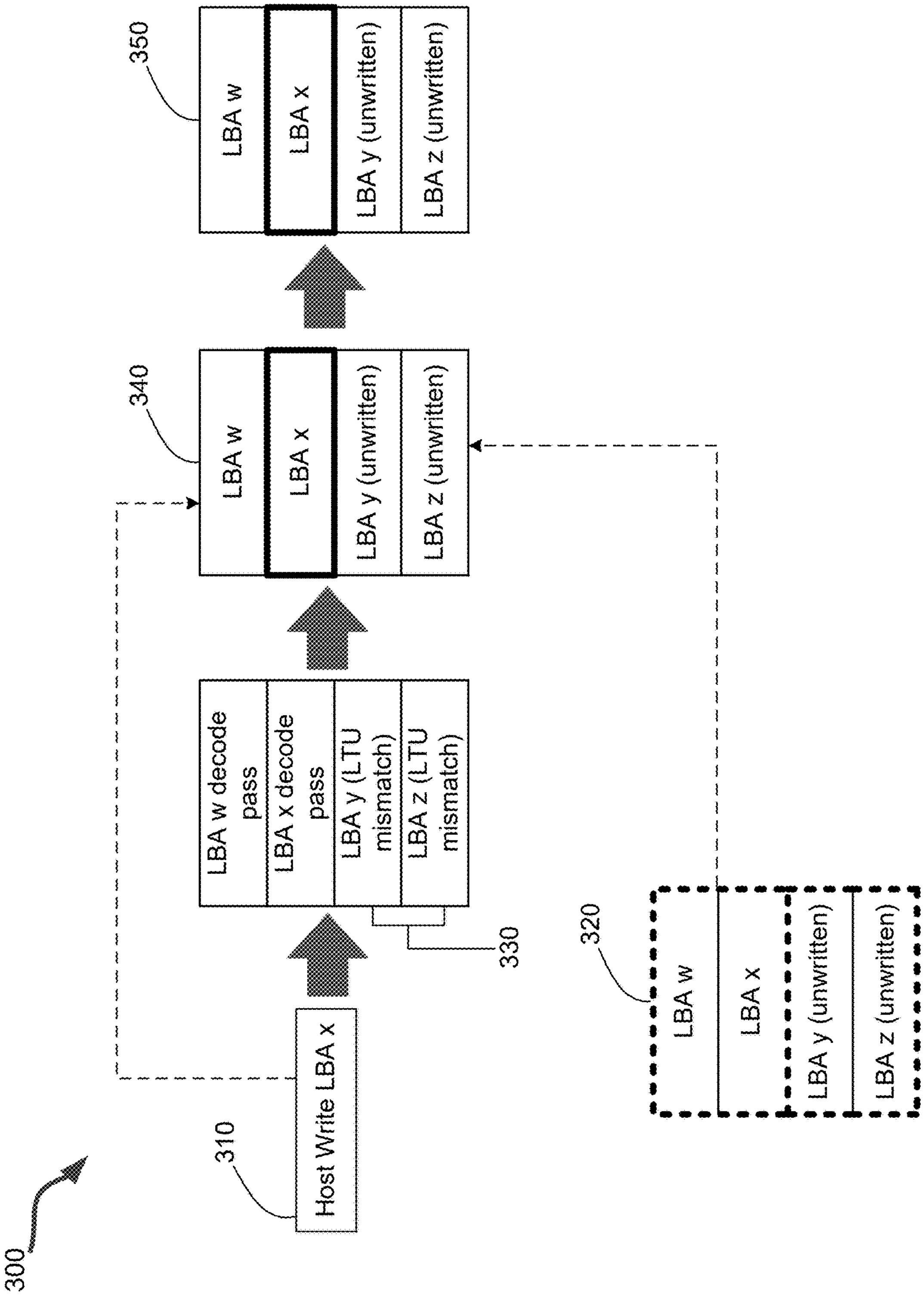
FIG. 3 illustrates a flow diagram of an example method of performing a write operation on a logical block address that maps to a physical block address on a memory device, in accordance with some embodiments of the present disclosure.

FIG. 3 illustrates a flow diagram of an example method 300 of performing a write operation on a logical block address (LBA) that maps to a physical block address on a memory device, in accordance with some embodiments of the present disclosure. A HS CPU (e.g., HS CPUs 210*a-n*) that is associated with a host device (e.g., a device that includes host system 120) can generate a command that contains data to be written to a block associated with a specific LBA (e.g., LBAx), as represented by element 310. The LBA of the block can indicate the specific memory device on which the block is located (e.g., any of dies 233*a-n*, dies 236*a-n*, dies 239*a-n*, dies 242*a-n*). The memory device can be located on a channel (e.g., from channel core clusters 230*a-n*) that is associated with a channel CPU (e.g., channel CPUs 231, 234, 237, 240). The channel CPU that is associated with the memory device on which the block is located can receive the write command.

The channel CPU can read data from the memory device to generate a translation unit (TU) that can be used to write data to the block. The channel CPU can store the data that is read from the memory device in a data segment, as represented by element 320. The data segment can include data that corresponds to a subset of blocks located on the memory device, including the block to which the data is to be written. The data segment can also include data that indicates whether each block of the subset of blocks is written or unwritten. A written block (or the LBA of the written block) can map to a physical block address on the memory device at which the data that is written to the block is stored. In some instances, an unwritten block (or the LBA of the unwritten block) can map to a physical block address on the memory device that is empty. Additionally or alternatively, an unwritten block (or the LBA of the unwritten block) might not map to a physical block address, thereby resulting in a logical TU (LTU) mismatch. In such instances, the unwritten block can have a LTU mismatch status. In some instances, the data segment can indicate the status of each block of the subset of blocks (e.g., whether a block is written or unwritten), as represented by element 330. For example, unwritten blocks that have a LTU mismatch status can be denoted as such. Further, written blocks that are associated with LBAs that map to physical block addresses on the memory device can be denoted as "decode pass."

The channel CPU can provide the data segment to the HS CPU. The HS CPU can identify, based on the received data segment, any blocks that have a LTU mismatch status. For each block with a LTU mismatch status, the HS CPU can further analyze the block to confirm that the LTU mismatch status is real. For example, the HS CPU can check the mapping between the LBA associated with the block and the corresponding physical block address to determine whether there is a mapping error. Based on determining that the LTU mismatch is real, the HS CPU can flag the block for manual intervention (e.g., from an administrator associated with the host device). Based on determining that the LTU mismatch is not real, the HS CPU can update the data segment. Specifically, the HS CPU can combine the data in the data segment (e.g., the data in the TU, as represented by element 320) with the data to be written to the block. The updated data segment can include the data to be written to the block and the status of the remainder of the blocks of the subset of blocks, as represented by element 340.

The HS CPU can provide the updated data segment to the channel CPU, as represented by element 350. Upon receipt of the updated data segment, the channel CPU can execute the write command. Specifically, the channel CPU can write, to the block indicated in the command, the data that is associated with the block in the updated data segment. In some instances, the data segment (and the updated data segment) can be read buffers. Therefore, the HS CPU can release a read buffer (e.g., the updated data segment), thereby enabling the channel CPU to access the read buffer and execute the write command based on the data in the read buffer.

Figure 4:
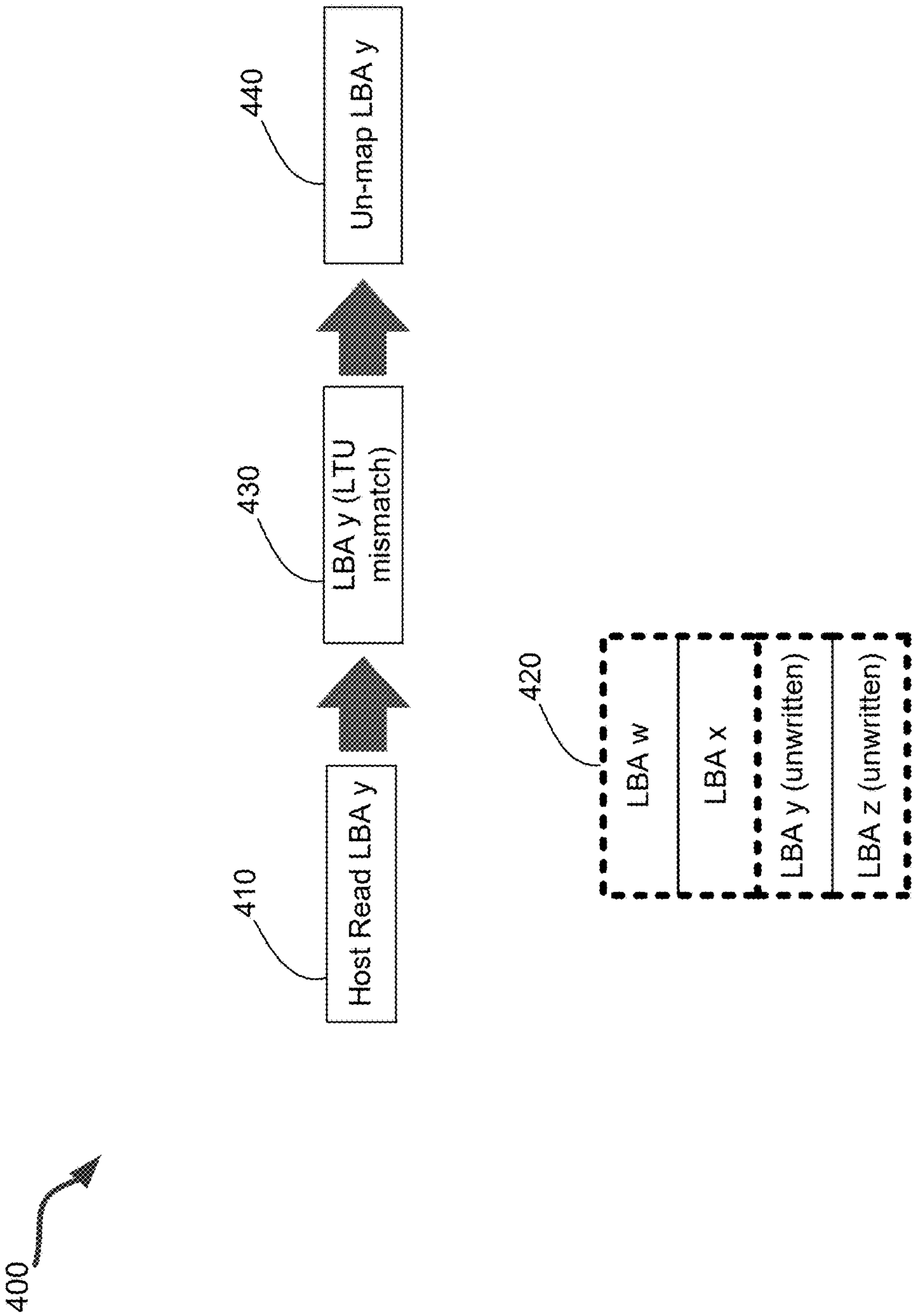
FIG. 4 illustrates a flow diagram of an example method of performing a read operation on a logical block address that maps to a physical block address on a memory device, in accordance with some embodiments of the present disclosure.

FIG. 4 illustrates a flow diagram of an example method 400 of performing a read operation on a logical block address (LBA) that maps to a physical block address on a memory device, in accordance with some embodiments of the present disclosure. A HS CPU (e.g., HS CPUs 210*a-n*) that is associated with a host device (e.g., a device that includes host system 120) can generate a command that contains instructions to read data from a block associated with a specific LBA (e.g., LBAy), as represented by element 410. A channel CPU that is associated with a memory device on which the block is located can receive the read command.

The channel CPU can read data from the memory device to generate a translation unit (TU) that can be used to read data from the block. The channel CPU can store the data that is read from the memory device in a data segment, as represented by element 420. The data segment can include data that corresponds to a subset of blocks located on the memory device, including the block from which the data is to be read. The data segment can also include data that indicates whether each block of the subset of blocks is written or unwritten. In some instances, an unwritten block (or the LBA of the unwritten block) might not map to a physical block address, thereby resulting in a logical TU (LTU) mismatch. In such instances, the unwritten block can have a LTU mismatch status. In some instances, the data segment can indicate the status of each block of the subset of blocks (e.g., whether a block is written or unwritten), experiences a LTU mismatch.

The channel CPU can provide the data segment indicating the status of each block of the subset of blocks to the HS CPU, as represented by element 430. The HS CPU can identify, based on the received data segment, any blocks that have a LTU mismatch status. For each block with a LTU mismatch status, the HS CPU can further analyze the block to confirm that the LTU mismatch status is real. For example, the HS CPU can check the mapping between the LBA associated with the block and the corresponding physical block address to determine whether there is a mapping error. Based on determining that the LTU mismatch is real, the HS CPU can flag the block for manual intervention (e.g., from an administrator associated with the host device). In some instances, based on determining that the LTU mismatch is real, the HS CPU can provide the host device with data for unmapping the LBA associated with the block from a physical block address on the memory device, as represented by element 440. Based on determining that the LTU mismatch is not real, the HS CPU can read the data from the block and provide the read data to the host device.

Figure 5:
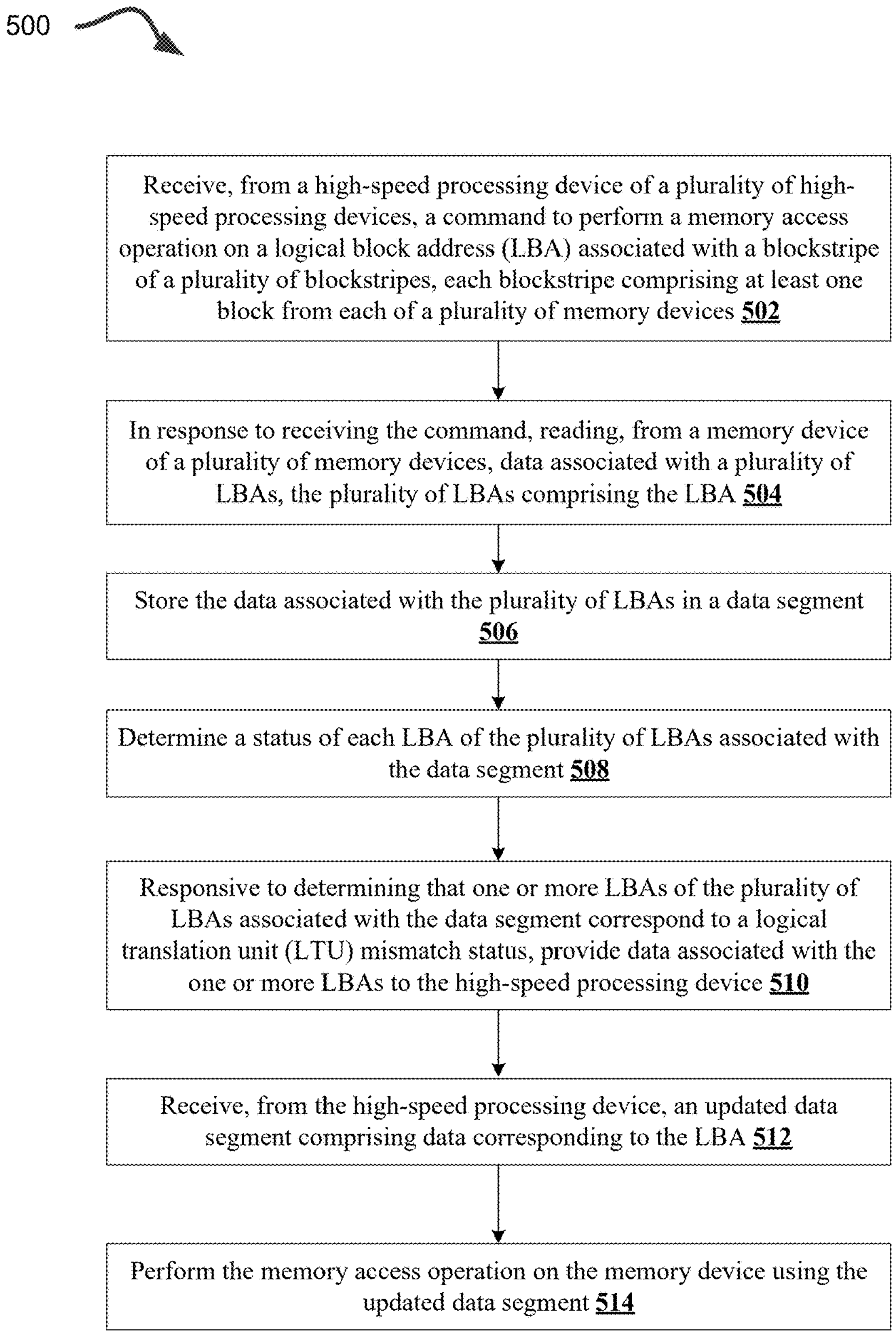
FIG. 5 illustrates an example method for reducing read latency based on logical translation unit (LTU) mismatch statuses, in accordance with some embodiments of the present disclosure.

FIG. 5 illustrates an example method for reducing read latency based on logical translation unit (LTU) mismatch statuses, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the read/write module 113 of FIG. 1 and/or any of channel CPUs 231, 234, 237, and/or 240 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic can receive, from a high-speed processing device of a plurality of high-speed processing devices (e.g., HS CPUs 210*a-n*), a command to perform a memory access operation on a logical block address (LBA). The LBA can be associated with a blockstripe of a plurality of blockstripes. Each blockstripe can include at least one block from each of a plurality of memory devices. In some instances, the command can include data to be written to an LBA. In some instances, the command can include instructions to read data from an LBA.

At operation 504, the processing logic can, in response to receiving the command, read, from a memory device of a plurality of memory devices, data associated with a plurality of LBAs. The plurality of LBAs can include the LBA indicated in the command. In some instances, the data that is associated with an LBA of the plurality of LBAs can include the data that is written to a physical block address that corresponds to the LBA. In some instances, the data that is associated with an LBA of the plurality of LBAs can include an indication that the physical block address that corresponds to the LBA is unwritten.

At operation 506, the processing logic can store the data associated with the plurality of LBAs in a data segment, also referred to herein as a translation unit (TU). For example, the data segment can correspond to elements 320 and/or 420.

At operation 508, the processing logic can determine a status of each LBA of the plurality of LBAs associated with the data segment. The status of each LBA can indicate whether the LBA is written or unwritten. In some instances, an LBA that is unwritten can indicate that the LBA does not map to a physical block address on the memory device. In some instances, the LBA that does not map to a physical block address can experience a logical TU (LTU) mismatch, thereby causing the LBA to have a LTU mismatch status.

At operation 510, the processing logic can, responsive to determining that one or more LBAs of the plurality of LBAs associated with the data segment correspond to a LTU mismatch status, provide data associated with the one or more LBAs to the high-speed processing device. Specifically, the processing logic can provide the high-speed processing device with the data segment.

At operation 512, the processing logic can receive, from the high-speed processing device, an updated data segment that includes data corresponding to the LBA. In instances where the command is a write command, the updated data segment can include the data to be written to the LBA that is indicated in the command. The updated data segment can also include data that is read from the remaining LBAs of the plurality of LBAs. In instances where the command is a read command and the LBA indicated in the command has a LTU mismatch status, the updated data segment can include data for unmapping the LBA from a physical block address on the memory device.

At operation 514, the processing logic can perform the memory access operation on the memory device using the updated data segment. In instances where the command is a write command, the processing logic can write the data in the updated data segment to the corresponding physical block addresses on the memory device. In instances where the command is a read command, the processing logic can unmap the LBA indicated in the read command from a physical block address on the memory device. Additionally or alternatively, in instances where the command is a read command, the processing logic can read data from the physical block address that maps to the LBA indicated in the command. The processing command can provide the read data to a host device (e.g., a device that includes host system 120) that is associated with the high-speed processing device.

Figure 6:
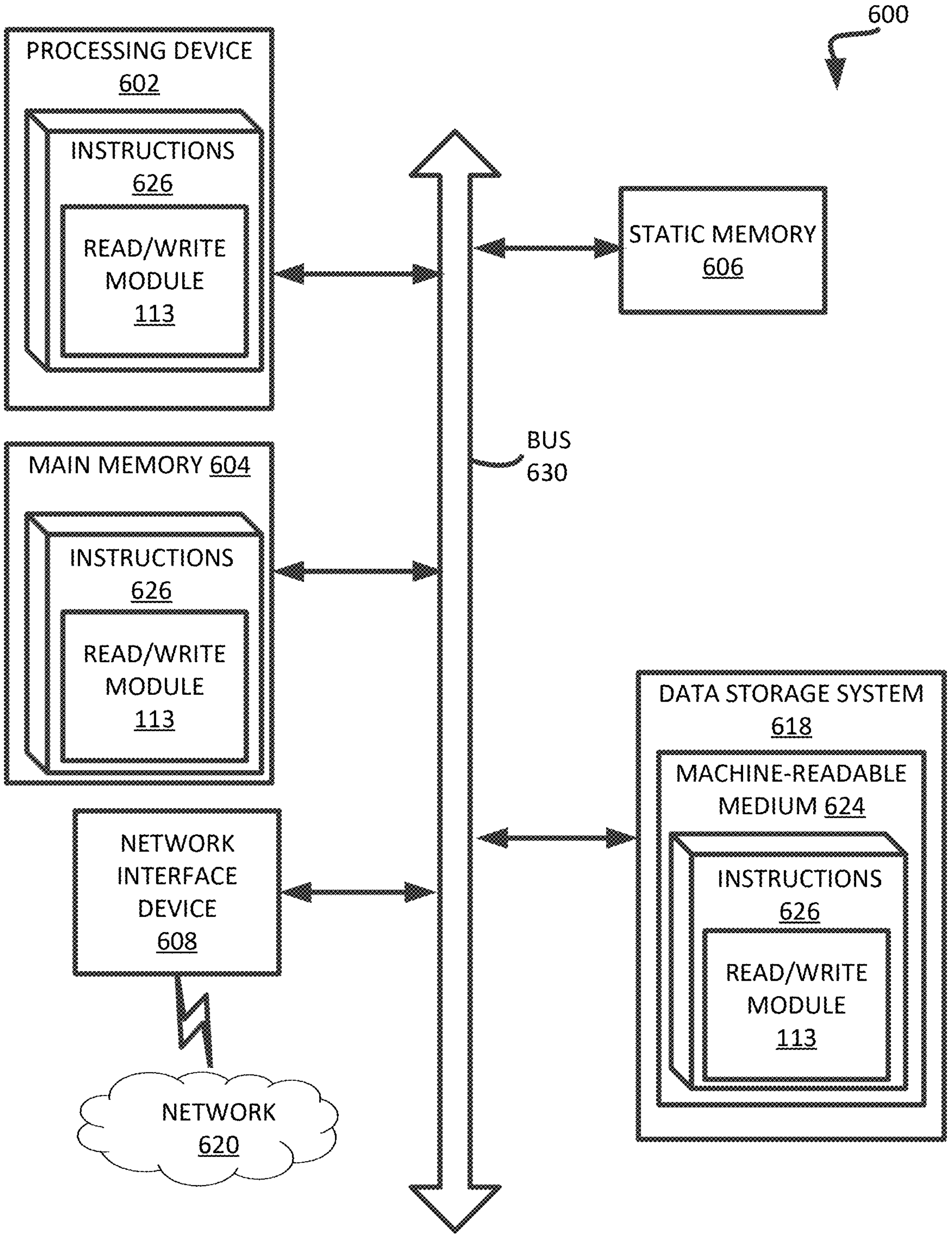
FIG. 6 illustrates a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the read/write module 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a read/write module (e.g., the read/write module 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
- a plurality of memory devices;
- a plurality of high-speed processing devices; and
- a plurality of channel cores operatively coupled to the plurality of memory devices and to the plurality of high-speed processing devices, and configured to perform operations comprising:
  - receiving, from a high-speed processing device of the plurality of high-speed processing devices, a command to perform a memory access operation on a logical block address (LBA) associated with a blockstripe of a plurality of blockstripes, each blockstripe comprising at least one block from each of the plurality of memory devices;
  - in response to receiving the command, reading, from a memory device of the plurality of memory devices, data associated with a plurality of LBAs, the plurality of LBAs comprising the LBA;
  - storing the data associated with the plurality of LBAs in a data segment;
  - determining a status of each LBA of the plurality of LBAs associated with the data segment;
  - responsive to determining that one or more LBAs of the plurality of LBAs associated with the data segment correspond to a logical translation unit (LTU) mismatch status, providing data associated with the one or more LBAs to the high-speed processing device;
  - receiving, from the high-speed processing device, an updated data segment comprising data corresponding to the LBA; and
  - performing the memory access operation on the memory device using the updated data segment.

2. The system of claim 1, wherein the data in the data segment indicates whether each LBA of the plurality of LBAs maps to a physical block address on the memory device.

3. The system of claim 1, wherein the LTU mismatch status indicates that the one or more LBAs of the plurality of LBAs do not map to physical block addresses on the memory device.

4. The system of claim 1, wherein the command comprises data to be written to the LBA.

5. The system of claim 4, wherein the updated data segment comprises the data to be written to the LBA and data that is read from each remaining LBA of the plurality of LBAs.

6. The system of claim 5, wherein the plurality of channel cores are further configured to perform operations comprising:
- writing the data in the updated data segment to corresponding physical block addresses on the memory device.

7. The system of claim 1, wherein the command comprises instructions to read data from the LBA.

8. The system of claim 7, wherein information in the updated data segment indicates that the LBA does not correspond to a physical block address on the memory device.

9. The system of claim 7, wherein information in the updated data segment comprises data for unmapping the LBA from a physical block address on the memory device.

10. The system of claim 1, wherein the plurality of channel cores are further configured to perform operations comprising:
- in response to determining that the one or more LBAs of the plurality of LBAs correspond to the LTU mismatch status, determining whether each LTU mismatch status is real.

11. The system of claim 10, wherein the plurality of channel cores are further configured to perform operations comprising:
- in response to determining that an LTU mismatch status associated with an LBA of the one or more LBAs is real, determining that a mapping between the LBA and a physical block address associated with the LBA contains an error.

12. A method comprising:
- receiving, from a high-speed processing device of a plurality of high-speed processing devices, a command to perform a memory access operation on a logical block address (LBA) associated with a blockstripe of a plurality of blockstripes, each blockstripe comprising at least one block from each memory device of a plurality of memory devices;
- in response to receiving the command, reading, from a memory device of the plurality of memory devices, data associated with a plurality of LBAs, the plurality of LBAs comprising the LBA;
- storing the data associated with the plurality of LBAs in a data segment;
- determining a status of each LBA of the plurality of LBAs associated with the data segment;
- responsive to determining that one or more LBAs of the plurality of LBAs associated with the data segment correspond to a logical translation unit (LTU) mismatch status, providing data associated with the one or more LBAs to the high-speed processing device;
- receiving, from the high-speed processing device, an updated data segment comprising data corresponding to the LBA; and
- performing the memory access operation on the memory device using the updated data segment.

13. The method of claim 12, wherein the command comprises data to be written to the LBA.

14. The method of claim 13, wherein the updated data segment comprises the data to be written to the LBA and data that is read from each remaining LBA of the plurality of LBAs.

15. The method of claim 14, further comprising:
- writing the data in the updated data segment to corresponding physical block addresses on the memory device.

16. The method of claim 12, wherein the command comprises instructions to read data from the LBA.

17. The method of claim 16, wherein information in the updated data segment indicates that the LBA does not correspond to a physical block address on the memory device; and wherein the information in the updated data segment comprises data for unmapping the LBA from the physical block address on the memory device.

18. A non-transitory computer readable storage medium comprising instructions that, when executed by a plurality of channel cores, cause the plurality of channel cores to perform operations comprising:

receiving, from a high-speed processing device of a plurality of high-speed processing devices, a command to perform a memory access operation on a logical block address (LBA) associated with a blockstripe of a plurality of blockstripes, each blockstripe comprising at least one block from each memory device of a plurality of memory devices;

in response to receiving the command, reading, from a memory device of the plurality of memory devices, data associated with a plurality of LBAs, the plurality of LBAs comprising the LBA;

storing the data associated with the plurality of LBAs in a data segment;

determining a status of each LBA of the plurality of LBAs associated with the data segment;

responsive to determining that one or more LBAs of the plurality of LBAs associated with the data segment correspond to a logical translation unit (LTU) mismatch status, providing data associated with the one or more LBAs to the high-speed processing device;

receiving, from the high-speed processing device, an updated data segment comprising data corresponding to the LBA; and performing the memory access operation on the memory device using the updated data segment.

19. The non-transitory computer readable storage medium of claim 18, wherein the plurality of channel cores are further configured to perform operations comprising:

writing the data in the updated data segment to corresponding physical block addresses on the memory device when the command comprises data to be written to the LBA.

20. The non-transitory computer readable storage medium of claim 18, wherein the plurality of channel cores are further configured to perform operations comprising:

unmapping the LBA from a physical block address on the memory device when the command comprises instructions to read data from the LBA and information in the updated data segment indicates that the LBA does not correspond to the physical block address on the memory device.

* * * * *